United States Patent
Klausmann et al.

(10) Patent No.: US 10,180,130 B2
(45) Date of Patent: Jan. 15, 2019

(54) ELECTRICALLY ACTUATED PRESSURE REGULATING VALVE FOR AN ADJUSTABLE HYDROSTATIC PUMP, AND ADJUSTABLE HYDROSTATIC PUMP HAVING A PRESSURE REGULATING VALVE

(71) Applicant: Robert Bosch GmbH, Stuttgart (DE)

(72) Inventors: Nadine Klausmann, Oberndorf (DE); Fabian Ruethschilling, Horb (DE); Andreas Apperger, Eutingen (DE); Carola Diebold, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 838 days.

(21) Appl. No.: 14/619,683

(22) Filed: Feb. 11, 2015

(65) Prior Publication Data
US 2015/0226204 A1 Aug. 13, 2015

(30) Foreign Application Priority Data
Feb. 11, 2014 (DE) .................. 10 2014 202 412

(51) Int. Cl.
*F04B 53/10* (2006.01)
*F04B 39/10* (2006.01)
(Continued)

(52) U.S. Cl.
CPC ............ *F04B 39/10* (2013.01); *F04B 1/20* (2013.01); *F04B 1/324* (2013.01); *F04B 53/10* (2013.01);
(Continued)

(58) Field of Classification Search
CPC ........ F04B 1/295; F04B 39/10; F04B 49/002; F04B 1/324; F04B 53/10; F04B 1/20;
(Continued)

(56) References Cited

U.S. PATENT DOCUMENTS

| 5,509,439 | A  | * | 4/1996 | Tantardini | ........... F15B 13/0402 137/269 |
| 7,555,899 | B2 | * | 7/2009 | Maier | .................. F04B 49/002 60/452 |
| 2010/0158706 | A1 | * | 6/2010 | Gruel | .................. F04B 49/002 417/222.1 |

FOREIGN PATENT DOCUMENTS

| DE | 43 29 164 A1 | 3/1995 |
| DE | 199 49 169 A1 | 4/2001 |
| DE | 100 01 826 C1 | 9/2001 |

OTHER PUBLICATIONS

Rexroth Bosch Group; Axial Piston Variable Pump; Data Sheet 92711; Apr. 2012; 44 Pages; A10VSO Series 31; Bosch Rexroth Corporation, USA.

* cited by examiner

*Primary Examiner* — Philip Stimpert
(74) *Attorney, Agent, or Firm* — Maginot, Moore & Beck LLP

(57) ABSTRACT

An electroproportionally controlled differential pressure valve cartridge includes actuation and tank ports on an outer circumference, and a pump port on a face-side. A spring preloads a piston into a position that relieves pressure from the actuation port to the tank port. A current increase through an electromagnet opposite the pump port and a pressure increase at the pump port counter the spring to open a connection from the pump port to the actuation port. A concentric opening extends from the pump port to a first piston surface. A duct extends from the first piston surface to a pump chamber. A further duct extends from the pump port to a spring chamber between the pump chamber and electromagnet. In the spring chamber, pressure over a second piston surface counters pressure over the first piston surface.

18 Claims, 2 Drawing Sheets

(51) Int. Cl.
  *F16K 31/06* (2006.01)
  *F16K 15/02* (2006.01)
  *F04B 1/20* (2006.01)
  *F04B 1/32* (2006.01)

(52) U.S. Cl.
  CPC .......... *F16K 15/02* (2013.01); *F16K 31/0613* (2013.01); *F04B 2201/06* (2013.01); *Y10T 137/7925* (2015.04)

(58) Field of Classification Search
  CPC .. F04B 2201/06; F16K 15/02; F16K 31/0613; Y10T 137/7825; Y10T 137/86622
  USPC ....................................................... 417/222.1
  See application file for complete search history.

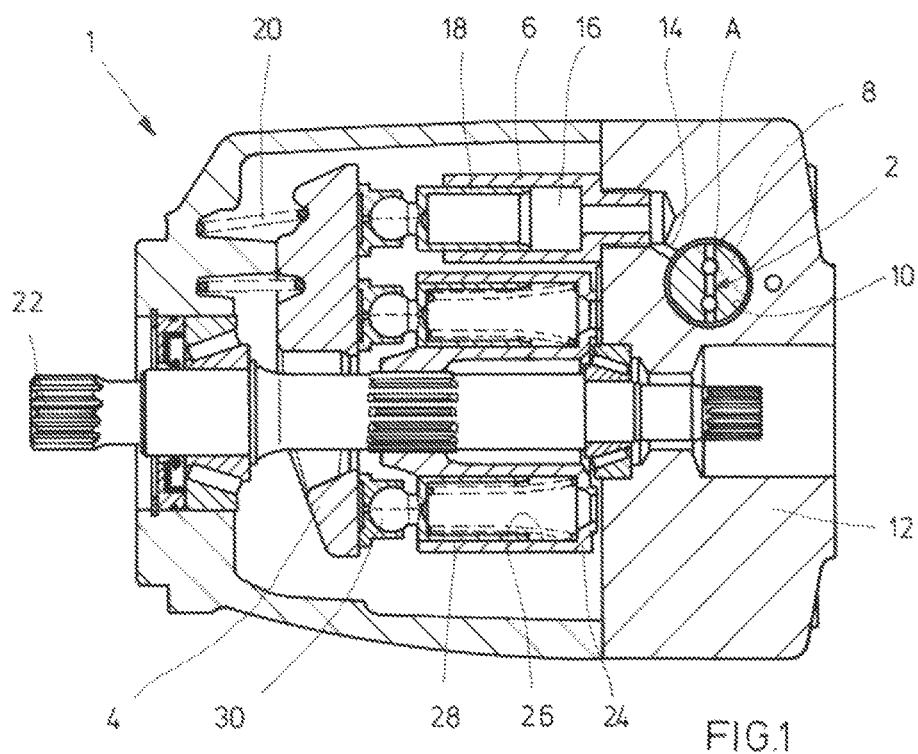
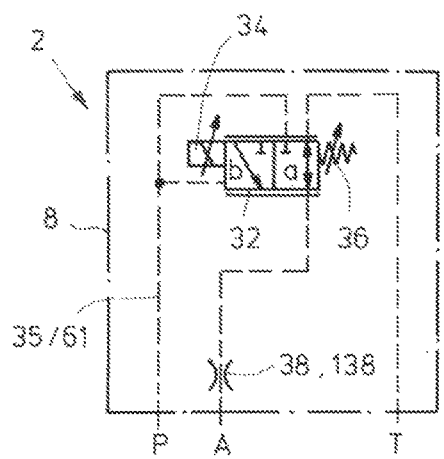 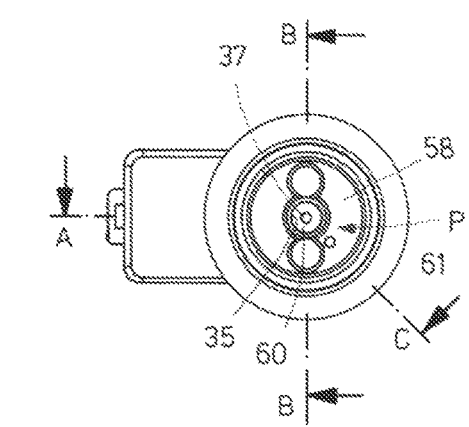
FIG.1
FIG.2
FIG.3

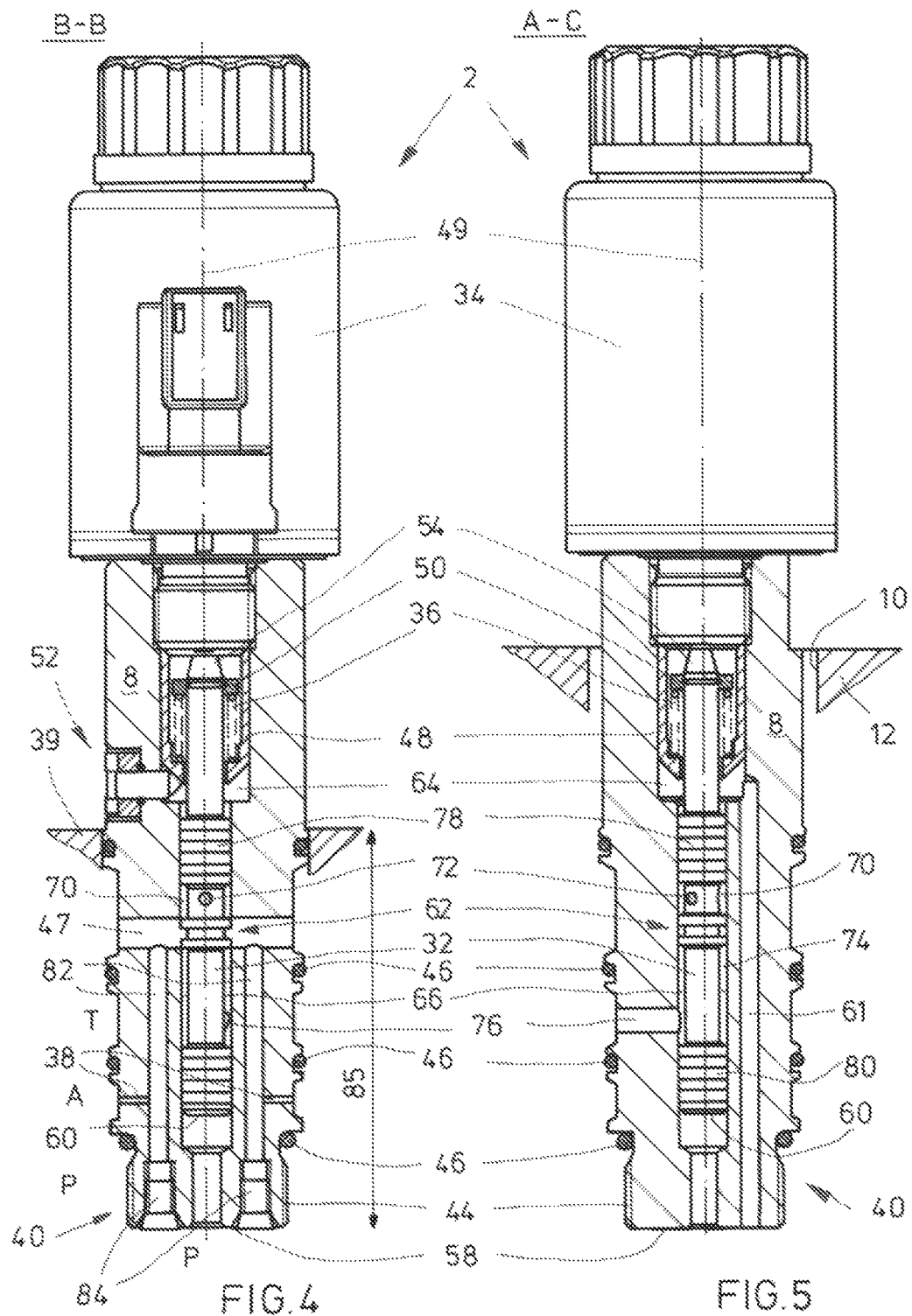

ELECTRICALLY ACTUATED PRESSURE REGULATING VALVE FOR AN ADJUSTABLE HYDROSTATIC PUMP, AND ADJUSTABLE HYDROSTATIC PUMP HAVING A PRESSURE REGULATING VALVE

This application claims priority under 35 U.S.C. § 119 to patent application no. DE 10 2014 202 412.9, filed on Feb. 11, 2014 in Germany, the disclosure of which is incorporated herein by reference in its entirety.

The disclosure relates to an electrically actuated pressure regulating valve for a hydrostatic pump which is adjustable in terms of delivery volume, and to a corresponding axial piston pump.

The adjustment of the delivery volume of hydrostatic pumps can be realized using an actuation pressure medium with which, for example, an actuation cylinder of a pivot cradle of an axial piston pump is charged and filled. In this case, a regulating valve controls the connection of the actuation cylinder to an actuation pressure medium source and to an actuation pressure medium sink, for example a tank.

BACKGROUND

From the prior art, it is known for a setpoint value for the position of the adjustment device to be predefined at the regulating valve and for travel or force feedback of the position of the adjustment device (for example of the actuation cylinder) to the regulating valve to be provided. In this way, during an adjustment, the regulating valve is influenced such that, when the desired position is reached, it returns to its neutral position again in which the actuation cylinder is separated from the actuation pressure medium source and from the actuation pressure medium sink.

Documents DE 100 01 826 C1 and DE 199 49 169 C2 present regulating valves of said type whose housings are each in the form of cartridges and whose respective longitudinal axis coincides with the longitudinal axis of an actuation piston of the actuation cylinder. In this case, feedback of the travel of the actuation piston is realized, which is converted into a force by means of an interposed spring.

In the case of pressure regulation arrangements for adjustable hydrostatic pumps known from the prior art, the pressure regulating valve is connected to the high-pressure side of the pump to be regulated, in order to detect the pump pressure thereof and "feed back" said pump pressure to the pressure regulating valve. In this case, the pump pressure on the valve body of the pressure regulating valve acts counter to a spring in the direction of a reduction of the delivery volume.

Furthermore, the actuation pressure medium which is required for the supply to the adjustment device of the pump and which is controlled by the pressure regulating valve can be picked off from the working line of the pump and supplied via the pressure regulating valve to the actuation cylinder in a manner dependent on the desired adjustment of the pump.

The applicant's publication RD 9 2711/01.12 A10VSO presents, on page 11/48, a pressure regulating valve of said type with feedback of the working pressure of the pump to be regulated. The pressure regulating valve acts as a pressure limiter for the working pressure of the pump. For this purpose, a spring acts on the valve body of the pressure regulating valve in the direction of an increase of the delivery volume of the pump. The maximum working pressure of the pump can be set by way of a preparatory adjustment of the preload of the spring.

The same publication from the applicant presents, on page 15/48, a pressure regulating valve arrangement in which, in addition to the main pressure regulating valve, an electrically adjustable pressure limiting valve with a falling characteristic curve is provided as pilot control valve, by means of which it is possible to adjust a control pressure which acts, together with the spring, on the valve body of the main pressure regulating valve in the direction of an increase of the delivery volume of a pump. In this way, an electrically actuated pressure regulating valve arrangement is created in which an increase of the current through an electromagnet effects a dissipation of the control pressure and thus a displacement of the valve body of the main pressure regulating valve in the direction of a reduction of the delivery volume, and thus of a reduction of the working pressure of the pump. Thus, the electrically actuated pressure regulating valve arrangement has a negative characteristic curve which, in the event of an electrical failure at the electromagnet, sets the set maximum pressure regulating value of the pump (failsafe).

A pressure regulator for a pump with a main pressure regulating valve and with an electromagnetically adjustable pilot-controlling pressure limiting valve with falling characteristic curve is also known from DE 43 29 164 A1.

A disadvantage of the latter electrically actuated pressure regulating valve arrangements is that the outlay in terms of apparatus and the installation space requirement are high because such arrangements involve a combination of the main pressure regulating valve and of the additional electrically actuated pilot-control valve.

SUMMARY

By contrast, it is the object of the disclosure to provide an electrically actuated pressure regulating valve for hydrostatic pumps, and a hydrostatic axial piston pump, for which the outlay in terms of apparatus and the installation space requirement are reduced.

Said object is achieved by means of an electrically actuated pressure regulating valve for a hydrostatic pump, and by means of a hydrostatic axial piston pump.

The disclosed pressure regulating valve is suitable for regulating the pressure of a hydrostatic pump, which is adjustable in terms of swept volume, and is in the form of a continuously adjustable 3/2 directional valve which has an actuation pressure port, a pump port and a tank port. In a main position of a control collar formed on a valve piston, into which main position said control collar is preloaded by a spring, the actuation pressure port is connected to the tank port. By the sum of the force of a proportional electromagnet and of the force exerted by the pump pressure at the pump port on an effective pressure surface on the valve piston, the valve piston can be moved counter to the force of the spring into switching positions in which a connection from the pump port to the actuation pressure port is opened up. In the event of an electrical failure, maximum pump pressure is adjusted to or set (negative or falling characteristic curve of the pressure regulating valve). According to the disclosure, the pressure regulating valve is directly controlled, whereby the outlay in terms of apparatus, in particular the number of components, and the installation space requirement are reduced. Furthermore, the standby pressure and the consumption of actuation pressure medium and control pressure medium are reduced. In the switching positions, a pressure medium flow path from the pump port via a duct arranged in the interior of the valve piston and via a pump control chamber and via the control collar to the actuation pressure port is opened, wherein the pump control chamber is arranged on a side of the control collar which faces away from the pump port. Through the duct, the pump pressure is conducted through the tank port and the actuation pressure port to that side of the valve piston which faces away from the pump port.

A particularly compact design is attained if the pump control chamber is delimited by the control collar.

In a preferred refinement which is of compact construction, the valve piston has a relatively small pressure surface which acts in the direction of the main position and a relatively large pressure surface which acts in the direction of the switching positions, wherein both pressure surfaces are acted on by the pump pressure. Thus, the pressure regulating valve is, with regard to the pump pressure, a differential pressure valve, on the valve piston, in the form of a stepped piston, of which there is exerted a resultant (control) force generated by the pump pressure, which (control) force acts, together with the force of the electromagnet, counter to the force of the spring. Thus, the increase of the current of the electromagnet results—at least over a partial range of the possible current values—in a proportional reduction of the pump pressure of the pump that is regulated by means of the pressure regulating valve according to the disclosure.

It is preferably the case that the force of the spring, the resultant force of the pump pressure and the force of the electromagnet act along a longitudinal axis of the valve body. This results in rotational symmetries which are advantageous from manufacturing and assembly aspects.

The pressure regulating valve may have a pump control chamber which is delimited by the control collar and by a guide collar of the valve piston and a pump pressure chamber which is separated from the pump control chamber by means of a second guide collar. The second guide collar preferably has the same diameter as the control collar. It is preferable if the pump control chamber is connected to the pump port via a duct running in the valve piston, whereas the pump pressure chamber is connected to the pump port via an eccentric axial duct arranged in the housing. It is thus ensured that both pump chambers are adequately supplied with pressure medium at all times. Furthermore, in this way, the supply to the control edge, which is operatively connected to the control collar, and is separated from the supply to the pump pressure chamber, with the result that there is no mutual influencing in particular in the event of a fast movement of the valve piston. The pump pressure chamber may simultaneously serve as a spring chamber. Instead of a separate connection of the pump control chamber and of the pump pressure chamber to the pump port, however, a connection via only one duct in the valve piston or in the housing is also conceivable.

The pressure surfaces may be divided, and may have an annular partial surface formed on the guide collar.

In a preferred refinement, the duct running in the valve piston has a concentric longitudinal bore which extends from a face surface, arranged in the region of the pump port, of the valve piston to the pump control chamber. Furthermore, the duct has one or more radial bores via which the longitudinal bore is connected to the pump control chamber.

In a particularly preferred refinement, the valve housing is a screw-cartridge (cartridge type of construction), on whose end section facing away from the electromagnet the pump port is arranged—preferably in the face side of the end section. Between the face side and the electromagnet, a first shell section of the screw-in cartridge having the actuation pressure port and a second shell section having the tank port are provided, wherein the first shell section is arranged closer than the second shell section to the end section. The pump port is preferably separated from the actuation pressure port by means of a seal, and said actuation pressure port is preferably separated from the tank port by means of a further seal. Thus, the pressure regulating valve according to the disclosure can be screwed into receptacles of pumps which have corresponding connections.

In the refinement with the screw-in cartridge and with the eccentric duct, it is preferable if the pump port is arranged on a face side of the screw-in cartridge and, there, has a concentric hole, connected directly to the small pressure face surface via a concentric axial duct, and has an eccentric mouth of the eccentric axial duct.

In the main position of the valve piston, the control collar opens a connection of an actuation pressure chamber to a tank pressure chamber, or in switching positions of the valve piston, opens up a connection of the actuation pressure chamber to the pump pressure chamber. The tank pressure chamber is arranged on that side of the control collar which faces away from the first pump pressure chamber.

In the refinement of the valve piston as a stepped piston, it is preferable for a radial step of the valve bore to be arranged in the tank pressure chamber.

The actuation pressure chamber may, in a simple manner in terms of manufacturing, be in the form of a continuous transverse bore of the screw-in cartridge. Said transverse bore may be closed off at both sides or is closed off for the first time as a result of the pressure regulating valve according to the disclosure being installed into a pump housing.

Eccentrically and preferably parallel with respect to a valve bore of the screw-in cartridge there may be arranged an actuation pressure duct which extends from the actuation pressure chamber to the actuation pressure port. Thus, said actuation pressure duct extends through the second shell section. Two for example symmetrical actuation pressure ducts may be provided. The one or more actuation pressure duct(s) may be closed off, and thus blocked with respect to the pump port, by means of a closure inserted into the face side.

It is preferable for a nozzle to be provided between the actuation pressure duct and the actuation pressure port. Said nozzle may, as a separate component, be inserted (for example screwed) into the screw-in cartridge in a radial direction with respect to the valve piston.

It is preferable if the spring is arranged in the second pump pressure chamber and is in the form of a compression spring which is braced between a first spring plate, supported on the screw-in cartridge, and a second spring plate, supported on the valve piston, wherein the second spring plate is supported on the valve piston in the region of the further face surface thereof. In the case of a compact refinement, the spring is with the spring plates of the in the second pump pressure chamber.

To be able to adapt the pressure regulating valve according to the disclosure to different pumps and usage situations, and in order to be able to compensate for manufacturing tolerances, it is particularly preferable if the preload of the spring can be adjusted by means of an adjustment device which is accessible on the outer circumference of the screw-in cartridge between the third shell section and the electromagnet. Accessibility may be provided only when the screw-in cartridge has not been screwed into a pump or when the screw-in cartridge has been screwed into a test block. This generates a certain inhibition threshold with regard to varying the setting of the screw-in cartridge that has been installed into the pump. By contrast, simple adjustment is possible on the test block. It may self-evidently also be provided that the adjustment device is also accessible when the screw-in cartridge is in the installed position on the pump, and thus the preload of the spring can also be adjusted when the screw-in cartridge is in the installed position on the pump.

In an embodiment which is simple in terms of apparatus, the adjustment device has an adjustment pin which is screwed radially into the screw-in cartridge and the radial position of which is thus adjustable and which bears against a conical abutment of the first spring plate, which is of sleeve-like or bushing-like form and is displaceable in the pump pressure chamber.

The hydrostatic axial piston pump according to the disclosure is of swashplate type of construction, such that a pivot angle of the swashplate can be adjusted by means of an actuation cylinder whose actuation pressure chamber is connected to the actuation pressure port of a pressure regulating valve as described above.

The pump may in particular a drive a hydrostatic fan motor of a mobile work machine or of a bus.

When the cartridge has been screwed into the pump housing, the third shell section is no longer accessible, such that the setting of the spring force can no longer be inadvertently changed.

BRIEF DESCRIPTION OF THE DRAWINGS

A hydrostatic pump according to the disclosure and an exemplary embodiment of a pressure regulating valve according to the disclosure for a pump are illustrated in the drawings. The disclosure will now be explained in more detail on the basis of the figures of the drawings, in which:

FIG. 1 shows the exemplary embodiment of a pump according to the disclosure with a pressure regulating valve according to the disclosure in a sectional illustration, FIG. 2 shows a circuit diagram of a pressure regulating valve according to the disclosure, FIG. 3 shows a plan view of the face side of an exemplary embodiment of a pressure regulating valve according to the disclosure, FIG. 4 shows the exemplary embodiment of a pressure regulating valve according to the disclosure in a section in the plane B-B from FIG. 3, and FIG. 5 shows the exemplary embodiment of a pressure regulating valve according to the disclosure in a section in the plane A-C from FIG. 3.

DETAILED DESCRIPTION

FIG. 1 shows an adjustable hydrostatic axial piston pump 1 of swashplate type of construction in a longitudinal section with a directly controlled pressure regulating valve 2 according to the disclosure in a cross section, which pressure regulating valve serves for providing a supply to an actuation cylinder 6 coupled to a swashplate 4. For this purpose, an actuation pressure port A which is arranged on the outer circumference of a housing, formed as a screw-in cartridge 8, of the pressure regulating valve 2 and on the inner circumference of a housing bore 10 of the housing 12 of the axial piston pump 1, is connected via an actuation pressure duct 14 to an actuation pressure chamber 16 of the actuation cylinder 6. Charging of the actuation pressure chamber 16 with actuation pressure medium effects a deployment of an actuation piston 18 counter to the force of the power unit and of an actuation spring 20, whereby the swashplate 4 is pivoted out and thus the delivery volume, and indirectly the working pressure of the axial piston pump 1, are increased. An evacuation of the actuation pressure chamber 16 effects a retraction of an actuation piston 18 assisted by the force of the actuation spring 20, whereby the swashplate 4 is pivoted back and thus the delivery volume and indirectly the working pressure of the axial piston pump 1 are reduced.

In the manner known from the prior art, the axial piston pump 1 is driven by means of a drive shaft 22 and delivers pressure medium from a tank into a working line. For this purpose, the axial piston pump 1 has a cylinder drum 24 which rotates together with the drive shaft 22 and in the cylinder bores 26 of which respective pistons 28 are guided, of which only two mutually oppositely situated cylinder bores 26 with pistons 28 are shown in FIG. 1. Since the pistons 28, as they rotate together with the cylinder drum 24, are braced by way of their piston bases 30 against the non-rotating swashplate 4 which is oriented obliquely with respect to the drive shaft 22, said pistons perform respective working strokes and deliver working pressure medium into the working line. By virtue of the swashplate 4 being pivoted out of the zero position shown in FIG. 1, the delivery volume of the cylinders (cylinder bores) 26 is increased.

FIG. 2 shows a circuit diagram of the pressure regulating valve 2 according to the disclosure. By means of a first section of a control and actuation pressure duct (not shown), the working line (not shown) of the axial piston pump 1 is connected to a pump port P of the pressure regulating valve 2. Via a duct arrangement 35/61 in the interior of the screw-in cartridge 8, the pump port P is connected to a valve piston 32 such that the pump pressure $p_P$ acts together with an electrically actuated electromagnet 34 counter to the adjustable force of a spring 36 on the valve piston 32 of the pressure regulating valve 2. In a main position a of the valve piston 32, into which the latter is preloaded by the spring 36, the actuation pressure port A is connected via a nozzle 38 to a tank port T, such that the power unit and the actuation spring 20 (cf. FIG. 1) can adjust the axial piston pump 1 to maximum delivery volume. With increasing force of the electromagnet 34 and/or with increasing pump pressure at the pump port P, the valve piston 32 is displaced into one of the switching positions b, such that actuation pressure medium from the pump port P is allowed to pass via the duct arrangement 35/61 and via the nozzle 38 to the actuation pressure port A. Thus, the actuation pressure chamber 16 of the actuation cylinder 6 is charged and the axial piston pump 1 is pivoted back.

FIG. 3 shows a face side 58 of the screw-in cartridge 8 of the exemplary embodiment of the pressure regulating valve 2 according to the disclosure as per FIGS. 1 and 2. Formed in said face side are a concentric axial duct 35, which conducts pump pressure, and an eccentric axial duct 61, which likewise conducts pump pressure. The figure shows the respective mouths 35, 61 in the face side 58 of the screw-in cartridge 8. The concentric axial duct 35 connects the face side 58 to a face surface of the valve piston 32, which serves as the relatively small pressure face surface 60. The eccentric axial duct 61 connects the face side 58 to a second pump pressure chamber 64. The latter is delimited by a relatively large pressure surface which is made up of partial surfaces of the valve piston 32. Thus, the pressure limiting valve is in the form of a differential pressure valve whose pressure force acting in the direction of the switching positions b is defined by the difference in size between the pressure surfaces.

Arranged in the relatively small pressure surface 60 of the valve piston 32 is a mouth of a duct 37 which extends concentrically in the interior of the valve piston 32. Said duct 37 connects the face surface 60 via radial bores 72 to an annular pump control chamber 70 formed at the outer circumference of the valve piston 32 on one side of a control collar 62 formed on the valve piston 32.

FIGS. 3 and 5 show the exemplary embodiment of the pressure limiting valve 1 according to the disclosure, in each case in a partially sectional illustration. The screw-in cartridge 8 has, on its end section 40, a screw thread 44 by means of which said screw-in cartridge can be screwed into the housing bore 10 of the housing 12 of the axial piston pump 1. Provided adjacent to the screw thread 44 is a seal 46 which separates the end section 40, on which the pump port P is also provided, from a first shell section of the screw-in cartridge 8, on which the actuation pressure port A is arranged. The first shell section with the actuation pressure port A is separated by means of a further seal 46 from a second shell section, on which the tank port T is arranged. The second shell section with the tank port T is separated by means of a further seal 46 from a third shell section which, in the exemplary embodiment shown, is impinged on with actuation pressure medium via a transverse bore 47, wherein said third shell section and the actuation pressure medium present therein are, in the assembled state, disconnected and rendered ineffective owing to a shut-off means provided in the housing 12 of the axial piston pump 1.

Provided on an outer end section of the screw-in cartridge 8 is the electromagnet 34 by means of which the valve piston 32 can be moved along a longitudinal axis 49 counter to the spring 36 (downward in FIGS. 4 and 5). The spring 36 is in the form of a compression spring and is braced between a bushing-like first spring plate 48 and a second spring plate 50. The first spring plate 48 is supported, via an adjustment device 52, on the screw-in cartridge 8, whereas the second spring plate 50 is supported on an end section 54 of the valve piston 32, and thus braces the valve piston 32 (upward in FIGS. 3 and 4).

Not only the magnet force of the electromagnet 34 but also a resultant force of the pump pressure $p_P$ act counter to the force of the spring 36 (downward in FIGS. 4 and 5). For this purpose, the pump pressure $p_P$ impinges on the relatively small pressure face surface 60 of the valve piston 32 via a central opening of the face side 58 of the screw-in cartridge 8 and via the concentric axial duct 35. Furthermore, via the eccentric axial duct 61, pump pressure medium is conducted from the face side 58 of said screw-in cartridge to the pump pressure chamber 64 arranged in the vicinity of the electromagnet 34, in which pump pressure chamber the spring 36 with the two spring plates 48, 50 is also accommodated. In this pressure chamber 64, the pump pressure $p_P$ acts over an entire pressure surface of the valve piston 32 which is larger than the relatively small pressure face surface 60 of the valve piston 32. This size difference yields the resultant force of the pump pressure $p_P$ in the direction of the switching positions b of the valve piston 32 in the form of a stepped piston (cf. FIG. 2). Said size difference furthermore yields a size difference of the valve bore, as shown by a step 66 in the valve bore.

Arranged in the interior of the third shell section is the control collar 62 of the valve piston 32, by means of which an actuation pressure chamber in the form of a continuous transverse bore 47 can be connected either to the pump port P or to the tank port T. In FIGS. 4 and 5, the control collar 62 is shown in a position in which it just blocks both connections. Provided adjacent to the control collar 62 at one side is the pump control chamber 70, which is formed by a radial constriction of the valve piston 32 and which is supplied with pump pressure medium via the duct 37 of the valve piston 32 and via the radial bores 72 thereof. Arranged adjacent to the control collar 62 at the other side is an annular tank control chamber 74 which is connected via a radial bore 76 to the second shell section and to the tank port T of the pressure regulating valve 2 according to the disclosure. At the side facing away from the control collar 62, the pump control chamber 70 is separated from the pump pressure chamber 64 by means of a guide collar 78. At its side facing away from the control collar 62, the tank control chamber 74 is separated from the pressure face surface 60 of the valve piston 32 by means of a sealing guide collar 80. The diameter of the guide collar 80 is smaller than the diameter of the control collar 62 and of the guide collar 78. The step 66 in the valve bore is accordingly situated in that region of the tank control chamber 74 in which tank pressure, or at any rate a very low pressure, prevails, such that despite the different diameter of guide collar 80 and control collar 62, no pressure force, or only a very small pressure force, is generated counter to the magnet force and the force generated by the pump pressure. The different diameters determine the different sizes of the first pressure surface and the second pressure surface which are acted on by the pump pressure.

FIG. 4 illustrates that the actuation pressure chamber in the form of transverse bore 47 is connected via two actuation pressure ducts 82 and via a respective nozzle 38 to the first shell section of the screw-in cartridge 8 and thus to the actuation pressure port A. More precisely, the two actuation pressure ducts 82 are arranged eccentrically and parallel with respect to the longitudinal axis 49, symmetrically with respect to one another. They have been formed into the screw-in cartridge 8 as bores from the face side 58, and subsequently closed off by means of a respective closure screw 84. The two nozzles 38 are, in the case of the first exemplary embodiment, in the form of relatively thin radial ducts and extend in each case from the first shell section to the associated actuation pressure duct 82. The nozzles may also be in the form of screw-in nozzles, such that it is possible for them to be exchanged for example during the course of being put into operation.

The two actuation pressure ducts 82, the transverse bore 47, the two nozzles 38 and the adjustment device 52 are arranged in a common plane which coincides with the section plane B-B of FIG. 4. By contrast, the eccentric axial duct 61 which serves as control and actuation pressure duct runs in a plane C which is tilted through 45° in relation to the section plane B-B of FIG. 4. The radial bore 76 of the tank port T runs in a further plane A which is tilted through 90° in relation to the section planes of FIG. 4.

According to the disclosure, the adjustment device 52 is arranged at a location along the longitudinal axis 49 which, in an installed state in an axial piston pump 1, is concealed and thus inaccessible, whereas said location remains accessible in an installed state in a test block (not shown), such that the preload of the spring 36 and thus the regulating behavior of the pressure regulating valve 2 according to the disclosure can be adjusted.

The spring plate 48 is received with its outer circumference slidingly in the pump pressure chamber 64. The spring 36 protrudes in sections into the spring plate 48. On the outer circumference of the spring plate 48 there is formed a conical abutment against which a conical abutment of a threaded pin 90 bears. The threaded pin 90 is held sealingly by means of a sealing nut 92 so as to be adjustable in a radial direction with respect to the longitudinal axis 49. By virtue of the threaded pin 90 being screwed in or out, the position of the spring plate 48 relative to the screw-in cartridge 8, and thus the force exerted by the spring 36 on the valve piston 32 via the second spring plate 50, is adjusted.

This yields the following balance of forces on the valve piston 32:

$$F_{Spring\ 36} = F_P + F_{Electromagnet\ 34} = p_P * A_{Diff} + F_{Electromagnet\ 34}$$

In this case, F denotes various forces, $p_P$ denotes the pump pressure, and $A_{Diff}$ denotes the surface area difference between the pressure surfaces.

The disclosure discloses an electroproportional pressure regulating valve of cartridge type of construction which can be screwed into a housing bore of a hydrostatic pump. An actuation pressure port and a tank port are provided on the outer circumference of the cartridge. A pump port is arranged on a face side of the cartridge. In a main position of a valve piston of the pressure regulating valve, into which said valve piston is preloaded by means of a spring, the actuation pressure port is relieved of pressure to the tank port. By means of an increase of a current through an electromagnet which is situated opposite the pump port, and by means of an increase of the pump pressure at the pump port, a connection from the pump port to the actuation pressure port can be opened up counter to the force of the spring. From the face-side pump port, a concentric opening extends to a relatively small pressure surface of the valve piston. A duct formed in the valve piston extends from the relatively small pressure surface to a first pump pressure chamber. Furthermore, a duct formed in the cartridge extends from the face-side pump port to a spring chamber which is arranged between the pump chamber and the electromagnet. In the spring chamber, the pump pressure over an entire pressure surface on the valve piston acts counter to the pump pressure of the relatively small pressure surface. Thus, the pressure regulating valve is a directly controlled differential pressure valve.

What is claimed is:

1. A pressure regulating valve for a pressure-regulated adjustable hydrostatic pump, configured as a continually adjustable 3/2 directional valve, and comprising:
   a housing with a face side at an axial end thereof, the housing including:
      a face-side pump port disposed at the face side and configured to provide a pump pressure;
      a lateral actuation pressure port;
      a lateral tank port; and
      the housing defining a valve bore;
   a valve piston that is received in the valve bore so as to be axially displaceable, and that includes a first pressure surface and a second pressure surface which is smaller than the first pressure surface;
   a spring configured to preload the valve piston via a spring force into a direction of a main position that enables a fluidic connection between the actuation pressure port and the tank port, wherein the valve piston is configured and arranged such that:
      the pump pressure acts on the first pressure surface to counter the spring force and in a direction of at least one switching position of the valve piston that enables a fluidic connection from the pump port to the actuation pressure port; and
      the pump pressure acts on the second pressure surface in the direction of the main position;
   a control collar configured and arranged to control the fluidic connection between the actuation pressure port and the tank port;
   a tank control chamber that is located in a region of the valve piston and on one side of the control collar, and that is fluidically connected to the tank port;
   a first guide collar that defines an extent of the tank control chamber in a direction of the pump port;
   a pump control chamber that is located in the region of the valve piston on an other side of the control collar, and that is fluidically connected to the pump port;
   an electromagnet that is configured and arranged to act on the valve piston to counter the spring force;
   a first spring plate supported on the housing and having a sleeve-like shape; and
   a second spring plate supported on the valve piston, the spring braced between the first spring plate and the second spring plate,
   wherein a position of the first plate is axially closer to the control collar than a position of the second spring plate relative to the control collar so that the spring force acts on the valve piston in a direction towards the electromagnet.

2. The pressure regulating valve according to claim 1, wherein:
   the first guide collar has a diameter that is smaller than a diameter of the control collar;
   a size of the first pressure surface is based at least in part upon the diameter of the first guide collar;
   a size of the second pressure surface is based at least in part upon the diameter of the control collar; and
   in a region of the tank control chamber, the valve bore transitions from a first diameter corresponding to the diameter of the first guide collar to a second diameter corresponding to the diameter of the control collar.

3. The pressure regulating valve according to claim 2, further comprising a pump pressure chamber that is separated from the pump control chamber by a second guide collar, wherein:
   the pump control chamber is located on the other side of the control collar, the other side of the control collar facing away from the pump port; and
   the pump control chamber and the pump pressure chamber are fluidically connected to the pump port via a common duct defined by the valve piston.

4. The pressure regulating valve according to claim 2, further comprising:
   a second guide collar, wherein the pump control chamber is located between the control collar and the second guide collar; and
   a pump pressure chamber that is separated from the pump control chamber by the second guide collar,
   wherein the pump control chamber is fluidically connected to the pump port via a first duct, and the pump pressure chamber is fluidically connected to the pump port via a second duct.

5. The pressure regulating valve according to claim 4, wherein one of the first and second ducts extends in an interior of the valve piston, and an other of the first and second ducts extends in the housing, parallel to the valve bore.

6. The pressure regulating valve according to claim 5, wherein the first duct defines:
   a longitudinal bore which extends along a first length from the first pressure surface to the pump control chamber, the longitudinal bore concentric with the valve piston along the first length; and one or more radial bores that connect the longitudinal bore to the pump control chamber.

7. The pressure regulating valve according to claim 4, wherein the housing is configured as a screw-in cartridge that includes a shell and has a face side at a longitudinal end of the shell, wherein:
the electromagnet is positioned on a side of the cartridge facing away from the pump port;
the actuation pressure port and the tank port are located on the shell; and
the actuation pressure port is located closer to an end section of the cartridge than a location of the tank port.

8. The pressure regulating valve according to claim 7, wherein the pump port is located on the face side of the cartridge, and defines:
a hole that is directly connected to the first pressure surface, and that is concentric with respect to the valve bore; and
a mouth of the second duct that is eccentric with respect to the valve bore.

9. The pressure regulating valve according to claim 7, further comprising an actuation pressure chamber that defines a transverse bore that is continuous with the cartridge.

10. The pressure regulating valve according to claim 9, further comprising an actuation pressure duct that is located in the cartridge, that is eccentric with respect to the valve bore, and that extends from the actuation pressure chamber to the actuation pressure port.

11. The pressure regulating valve according to claim 10, further comprising a nozzle positioned between the actuation pressure duct and the actuation pressure port.

12. The pressure regulating valve according to claim 1, further comprising a pump pressure chamber that is separated from the pump control chamber by a second guide collar, the spring positioned in the pump pressure chamber.

13. The pressure regulating valve according to claim 12, further comprising an adjustment device that is configured to adjust a magnitude of the spring force, and that includes a threaded pin that is radially screwed into the housing such that a radial position of the threaded pin is adjustable;
wherein the first spring plate includes a conical abutment and is configured and arranged to be displaceable in the housing; and
wherein the threaded pin bears against the conical abutment.

14. The pressure regulating valve according to claim 1, wherein the first spring plate has a conical abutment at one end and at least one wall that extends axially from the conical abutment.

15. The pressure regulating valve according to claim 14, wherein the at least one wall defines an interior space of the first spring plate, the second spring plate and the spring disposed within the interior space of the first spring plate.

16. A pressure regulating valve for a pressure-regulated adjustable hydrostatic pump, configured as a continually adjustable 3/2 directional valve, and comprising:
a housing with a face side at an axial end thereof, the housing defining:
a face-side pump port disposed at the face side and configured to provide a pump pressure;
a lateral actuation pressure port;
a lateral tank port; and
a valve bore;
a valve piston that is received in the valve bore so as to be axially displaceable, and that includes a first pressure surface and a second pressure surface which is smaller than the first pressure surface;
a spring configured to preload the valve piston via a spring force into a direction of a main position that enables a fluidic connection between the actuation pressure port and the tank port, wherein the valve piston is configured and arranged such that:
the pump pressure acts on the first pressure surface to counter the spring force and in a direction of switching positions of the valve piston that enable a fluidic connection from the pump port to the actuation pressure port; and
the pump pressure acts on the second pressure surface in the direction of the main position;
a control collar configured and arranged to control the fluidic connection between the actuation pressure port and the tank port;
a tank control chamber that is located in a region of the valve piston and on one side of the control collar, and that is fluidically connected to the tank port;
a first guide collar that defines an extent of the tank control chamber in a direction of the pump port;
a pump control chamber that is located in the region of the valve piston on an other side of the control collar, and that is fluidically connected to the pump port;
an electromagnet that is configured and arranged to act on the valve piston to counter the spring force;
a first spring plate supported on the housing and having a sleeve-like shape;
a second spring plate supported on the valve piston, the spring braced between the first spring plate and the second spring plate;
a pump pressure chamber that is separated from the pump control chamber by a second guide collar, the spring positioned in the pump pressure chamber; and
an adjustment device that is configured to adjust a magnitude of the spring force, and that includes a threaded pin that is radially screwed into the housing such that a radial position of the threaded pin is adjustable;
wherein the first spring plate includes a conical abutment and is configured and arranged to be displaceable in the housing; and
wherein the threaded pin bears against the conical abutment.

17. A pressure regulating valve for a pressure-regulated adjustable hydrostatic pump, configured as a continually adjustable 3/2 directional valve, and comprising:
a housing with a face side at an axial end thereof, the housing including:
a face-side pump port disposed at the face side and configured to provide a pump pressure;
a lateral actuation pressure port;
a lateral tank port; and
the housing defining a valve bore;
a valve piston that is received in the valve bore so as to be axially displaceable, and that includes a first pressure surface and a second pressure surface which is smaller than the first pressure surface;
a spring configured to preload the valve piston via a spring force into a direction of a main position that enables a fluidic connection between the actuation pressure port and the tank port, wherein the valve piston is configured and arranged such that:
the pump pressure acts on the first pressure surface to counter the spring force and in a direction of at least one switching position of the valve piston that enables a fluidic connection from the pump port to the actuation pressure port; and the pump pressure acts on the second pressure surface in the direction of the main position;

a control collar configured and arranged to control the fluidic connection between the actuation pressure port and the tank port;

a tank control chamber that is located in a region of the valve piston and on one side of the control collar, and that is fluidically connected to the tank port;

a first guide collar that defines an extent of the tank control chamber in a direction of the pump port;

a pump control chamber that is located in the region of the valve piston on an other side of the control collar, and that is fluidically connected to the pump port;

an electromagnet that is configured and arranged to act on the valve piston to counter the spring force;

a second guide collar, the pump control chamber located between the control collar and the second guide collar; and a pump pressure chamber that is separated from the pump control chamber by the second guide collar, wherein the pump control chamber is fluidically connected to the pump port via a first duct, and the pump pressure chamber is fluidically connected to the pump port via a second duct, and wherein the pump port defines (i) a hole that is directly connected to the first pressure surface, and that is concentric with respect to the valve bore and (ii) a mouth of the second duct that is eccentric with respect to the valve bore.

18. The pressure regulating valve according to claim 1, further comprising an adjustment device configured to adjust a magnitude of the spring force.

\* \* \* \* \*

UNITED STATES PATENT AND TRADEMARK OFFICE
CERTIFICATE OF CORRECTION

PATENT NO. : 10,180,130 B2
APPLICATION NO. : 14/619683
DATED : January 15, 2019
INVENTOR(S) : Klausmann et al.

Page 1 of 1

It is certified that error appears in the above-identified patent and that said Letters Patent is hereby corrected as shown below:

In the Claims

In Column 10, Lines 19-20, Lines 45-46 of Claim 1 should read:
wherein a position of the first spring plate is axially closer to the
control collar than a position of the second spring plate Signed and Sealed this
Twenty-third Day of April, 2019

Andrei Iancu
*Director of the United States Patent and Trademark Office*